United States Patent [19]

Sendelweck

[11] Patent Number: 4,549,217
[45] Date of Patent: Oct. 22, 1985

[54] AUTOMATIC CONTRAST REDUCTION CIRCUIT FOR A TELETEXT OR MONITOR OPERATION

[75] Inventor: Gene K. Sendelweck, Indianapolis, Ind.

[73] Assignee: RCA Corporation, Princeton, N.J.

[21] Appl. No.: 536,713

[22] Filed: Sep. 30, 1983

[51] Int. Cl.⁴ .............................................. H04N 5/68
[52] U.S. Cl. ..................................... 358/243; 358/169
[58] Field of Search ............... 358/169, 243, 174, 188, 358/903

[56] References Cited

U.S. PATENT DOCUMENTS

| | | | |
|---|---|---|---|
| 4,126,884 | 11/1978 | Shanley, II | 358/21 |
| 4,167,025 | 9/1979 | Willis | 358/243 |
| 4,253,110 | 2/1981 | Harwood | 358/243 |
| 4,295,166 | 10/1981 | Shanley, II | 358/243 |
| 4,319,277 | 3/1982 | Nicholson et al. | 358/165 |
| 4,338,623 | 7/1982 | Asmus et al. | 358/22 |

FOREIGN PATENT DOCUMENTS 004197 9/1979 European Pat. Off. .
074081 3/1983 European Pat. Off. .

Primary Examiner—Tommy P. Chin
Attorney, Agent, or Firm—P. J. Rasmussen; P. M. Emanuel; R. H. Kurdyla

[57] ABSTRACT

In a TV receiver responsive to either conventional television video signals or an auxiliary video signal representative of alphanumeric text or graphic information, to prevent undesired "blooming" of the display due to high kinescope beam currents when the alphanumeric text or graphics are displayed on the screen of a kinescope, means are provided for reducing at least one amplitude characteristic of the auxiliary video signal, such as its peak-to-peak signal level (contrast) so as to reduce the kinescope beam current whenever the alphanumeric text or graphics are displayed.

2 Claims, 2 Drawing Figures

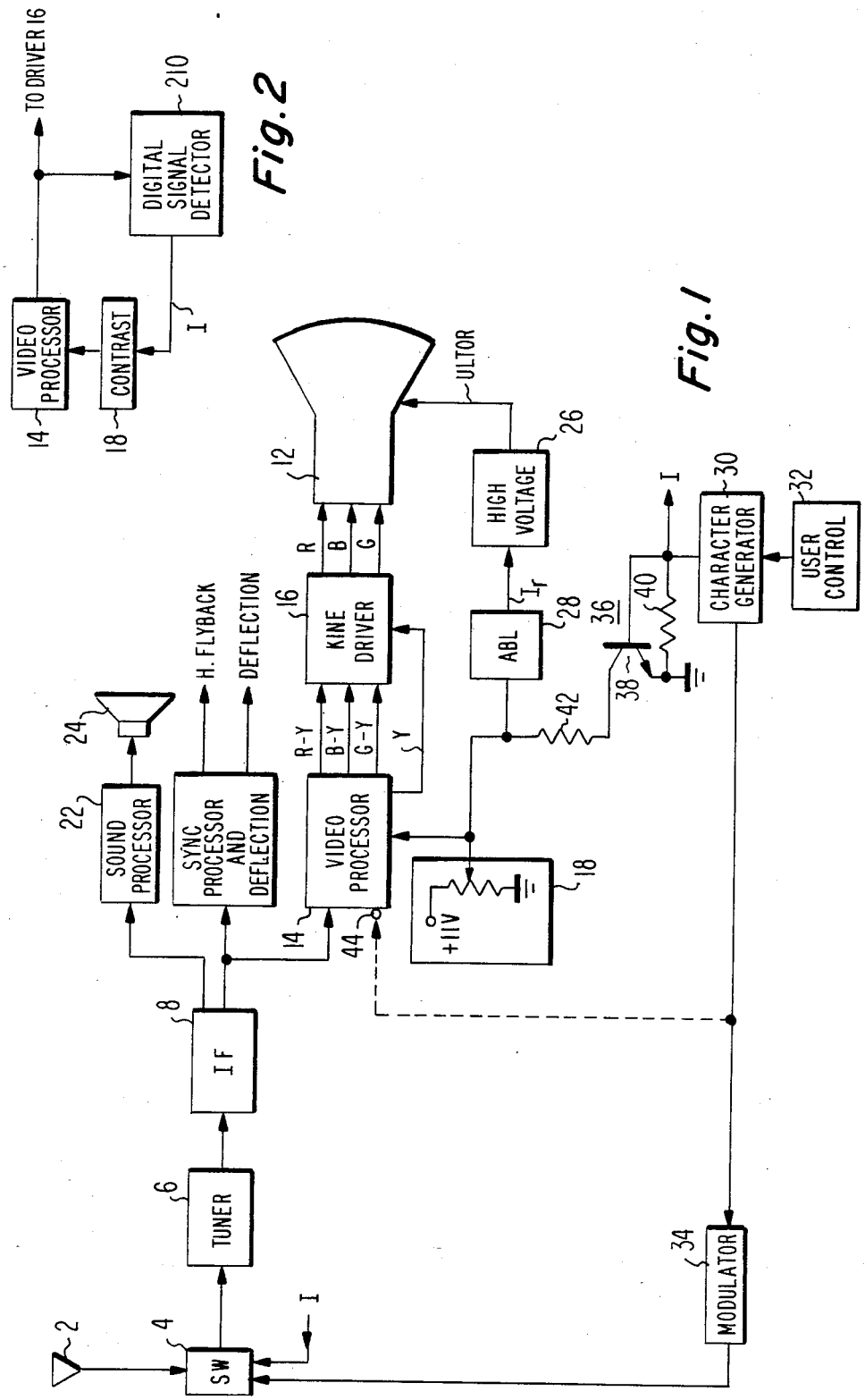

AUTOMATIC CONTRAST REDUCTION CIRCUIT FOR A TELETEXT OR MONITOR OPERATION

The present invention relates to the display of alphanumeric or graphic information by an image reproducing device such as a kinescope and, in particular, to reducing current drawn by an image reproducing device during time periods when the alphanumerics or graphics are displayed in place of normal scenic images in order to reduce graphic image distortions.

Television (TV) receivers are increasingly being used not only as receivers for processing conventional video signals to reproduce moving images on the screen of a kinescope representative of a televised scene, but also as a monitor for processing auxiliary video signals to reproduce alphanumeric text and graphic displays on the screen of the kinescope. These auxiliary signals may be derived, for example, from a teletext decoder, video game or computer and applied to the TV receiver via the antenna input terminals. The video processing stage of the TV receiver includes circuitry for controlling the amplitude characteristics of the processed video signal, such as its peak-to-peak level and D.C. level which affects the contrast and brightness, respectively, of the reproduced images. Since the luminance component of a conventional video signal typically has relatively few occasions where its signal level approaches peak white levels, contrast and brightness levels of the video processing stage are set relatively high for reproducing optimum images on the kinescope. However, the digital nature of alphanumeric and graphic video signals is such that the signal levels are either maximum or minimum and consequently there are many occasions where signal levels are at peak white levels.

It has been noted by the present inventor that when alphanumeric text and/or graphics are reproduced, the substantial number of peak white signal portions of these digital signals may tend to overdrive the kinescope causing defocusing or "blooming" of the alphanumerics or graphics.

Typically, TV receivers include protection circuitry, such as an ABL (automatic beam current limiter) circuit, which may be of the type described in U.S. Pat. No. 4,167,025 (Willis) entitled, "Automatic Peak Beam Current Limiter", for sensing excessive beam current (i.e., beam current which exceeds a preset threshold level) and deriving a control signal which is applied so as to reduce kinescope current conduction before the undesired blooming or other distortions of the displayed image occurs. ABL circuits of this type may include both an average current and peak current sensing circuit, for determining when kinescope beam current levels exceed a preset threshold level before reduction in kinescope conduction occurs.

U.S. patent application Ser. No. 536,712 entitled IMPROVED ON-SCREEN DISPLAY by R. Norley, et al. filed concurrently herewith an assigned like the present application to RCA Corporation, describes a control circuit which automatically reduces the preset threshold level of the beam current limiter whenever graphics, such as a vertical tuning indication bar is displayed concurrently with a conventional television image on the screen of the kinescope. However, when only alphanumeric or graphic signals are to be reproduced by the kinescope, the relatively short duration of the peak white signal portions of the alphanumeric and graphic video signals and their relatively low average value are such that the average and peak beam current levels may never exceed the preset threshold levels which result in generation of the ABL control signal. Although the present threshold level of the ABL circuit may be automatically reduced whenever graphics are to be displayed, due to the above-noted characteristics of alphanumeric signals, the threshold level would have to be substantially reduced in order to assure the threshold level can be exceeded. Unfortunately, at such a reduced threshold level, the ABL circuit could become very sensitive and may modulate the beam current based on the amount of graphics or density of the alphanumerics text displayed on the kinescope.

In accordance with the principles of the present invention, a video signal processing channel is provided which is adapted to be responsive to either a conventional video signal representative of a normal televised scene or an auxiliary video signal representative of alphanumeric text or graphic images. A control circuit is coupled to the video signal processing channel for altering its amplitude translation characteristics such as the contrast or brightness levels. The control circuit is responsive to a signal indicating that only the auxiliary video signal is being applied to the processing channel for reducing the amplitude translation characteristics of the channel.

In the drawings:

FIG. 1 illustrates, partially in block diagram form and partially in schematic diagram form, a television receiver employing apparatus constructed in accordance with the present invention; and FIG. 2 illustrates in block diagram form circuitry useful in an alternative embodiment of the present invention.

The color television receiver shown in FIG. 1 includes an antenna 2 for receiving VHF and UHF RF signals. A switch 4 applies, when set to do so as will be described below, the RF signals received from antenna 2 to a tuner 6 which converts the RF signal corresponding to the selected channel to a corresponding IF signal. The IF signal is filtered, amplified and demodulated to provide a composite video signal at the output of an IF amplifier and detector stage 8. The composite video signal contains luminance, chrominance, sound and synchronizing components.

A sync processor and deflection stage 10 serve to separate the synchronizing (sync) component including horizontal and vertical synchronization pulses from the composite video signal and provide horizontal and vertical deflection signals, which are used in a known manner, for scanning a raster on a kinescope 12.

A video processor 14 processes the chrominance component of the composite video signal to supply R-Y, B-Y and G-Y color difference signals to respective inputs of a kinescope driver stage 16. Video processor 14 also processes the luminance component of the composite video signal to supply a luminance signal Y to a respective input of kinescope driver stage 16 where the luminance signal is combined with the color difference signals to form R, B, and G color signals. These signals are then coupled to signal inputs (e.g., cathode electrodes) of kinescope 12 for reproducing a color image of the received video signal. A contrast control stage 18 includes a viewer controllable potentiometer 20 for providing a variable DC voltage at it wiper which is applied to video processor 14 for changing the gain of an amplifier in the luminance section of video processor 14 to thereby change the peak-to-peak signal level (contrast) of the luminance signal.

Sound components of the IF signal are processed by a sound processor 22 to derive an audio signal which is reproduced by a loudspeaker 24.

High operating voltages for focus (not shown) and ultor electrodes of kinescope 12 are provided by a high voltage supply 26 in response to periodic horizontal flyback pulses occuring during horizontal retrace scanning intervals. A "resupply" current $I_r$ (i e., a current coupled via the high voltage stage to recharge or resupply the ultor electrode voltage of the kinescope which is depleted as a result of beam current conduction) is representative of the beam current (i.e, ultor current) demand of the kinescope in response to the drive signals applied to it from driver stage 16.

An automatic beam current limiter (ABL) 28 senses when the resupply current $I_r$ exceeds a predetermined threshold level indicating the presence of excessive beam current demand. ABL stage 28 then develops an output control signal in accordance with the magnitude of the excessive beam current. This control signal is applied to video processor 14 in such a manner as to control the amplitude translation characteristics of processor 14 to reduce excessive beam currents. In the illustrated embodiment, this control signal is applied to the wiper of contrast control potentiometer 20 for reducing the AC peak-to-peak level (contrast) of the luminance signal in proportion to the amount the resupply current exceeds the predetermined threshold level. An ABL stage and its coupling to the contrast control of the video processor in a manner for reducing excessive kinescope beam currents when alphanumerics or graphics are displayed in conjuntion with video signals representative of a scene, is described in greater detail in the forenoted concurrently filed U.S. patent application of R. Norley, et al.

A character generator 30 which may be included, for example, in a teletext decoder, video game or computer, is the source of auxiliary video signals representative of alphanumeric text or graphic information which are generated in response to user activation by means of a control unit 32. A modulator 34 provides an RF carrier modulated by the auxiliary video signal to switch 4, which in response to a signal I supplied by character generator 30 indicating the presence of the auxiliary video signal, decouples the RF signals received by antenna 2 from the input of tuner 6 and instead couples the RF signal from modulator 34 to the tuner input. The auxiliary video signal is processed in the same manner as described above for the conventional television signal for reproducing alphanumeric text or graphics on the screen of kinescope 12.

As previously noted, when alphanumeric text and/or graphics are reproduced, the substantial number of peak white signals portions of these digital signals may tend to overdrive the kinescope causing defocusing or "blooming" of the alphanumerics or graphics. Due to the relatively short duration of the peak white signal portions of these digital signals and their relatively low average value, the average and peak beam current levels may never exceed the preset threshold levels which result in generation of the ABL control signal for automatically reducing kinescope current conduction and undesired blooming or other distortions of the displayed image may occur.

In accordance with the principles of the present invention, this undesired blooming of the displayed image is eliminated by automatically altering an amplitude translation characteristic of the video signal processing channel whenever the auxiliary video signal representative of alphanumeric text or graphic information is displayed.

More specifically, the signal I supplied by character generator 30 whenever the auxiliary video signal is displayed, controls the operation of a stage 36 including a transistor 38, bias resistor 40 and a collector resistor 42 coupled to the wiper of contrast potentiometer 20 for reducing the level of the contrast control voltage (by voltage divider action). This results in a reduced peak-to-peak amplitude translation characteristic of video processor 14 which reduces kinescope current conduction so as to prevent image blooming whenever the alphanumeric text or graphic information is displayed.

While the invention has been described in terms of a preferred embodiment, it should be recognized that various modifications can be made by persons skilled in the art without departing from the scope of the invention. For example, the signal I may have a potential such that it can be directly applied to the wiper of potentiometer 20 via resistor 42, for effecting the desired reduction in video signal peak-to-peak amplitude. Also, the peak signal level of the chrominance alone or both of the luminance and chrominance components of the video signal can be reduced. Furthermore, the D.C. level (brightness) of the luminance component can also be reduced whenever the auxiliary signal is to be displayed. Additionally, the baseband composite video signal at the output of character generator 30 can be applied directly to an auxiliary signal input 44 of video processor 14 (as shown in dashed lines). Video processor 14 may include a circuit for sensing when an auxiliary baseband signal is applied at input 44 for providing the signal I indicating that alphanumeric text or graphics are displayed. This signal could also be used to deactivate the tuner 6 and IF stage 8 and also cause a portion of the auxiliary video signal to be coupled to sync processor and deflection stage 10 for developing the flyback and deflection signals therefrom. Finally, as shown in FIG. 2, the signal I may be generated by a digital signal detector 210, which recognizes when alphanumeric text or graphic signals are being processed due to the digital nature of these signals. These and other modifications can be made by persons skilled in the art without departing from the scope of the invention.

What is claimed is:

1. In a system including a switching means for supplying either a conventional television video signal representative of a televised scene or auxiliary video signals representative alphanumeric text or graphics, a signal processing channel for processing said conventional or auxiliary video signals and an image reproducing device for reproducing the televised scene in response to said processed conventional video signal or the alphanumeric text or graphics in response to said processed auxiliary video signals, and means for sensing current drawn by said image reproducing device which is responsive to the amplitude characteristics of said processed conventional and auxiliary signals, apparatus for modifying said current drawn by said image reproducing device comprising:

means coupled to said signal processing channel and said sensing means for modifying the signal translation characteristics of said signal processing channel to reduce the level of said current drawn by said image reproducing device;

means for generating a control signal;

said switching means supplying said auxiliary video signals to said video signal processing channel in response to said control signal; and means coupled to said signal translation characteristic modifying means and responsive to said control signal for causing said signal translation characteristic modifying means to further reduce the amplitude characteristics of said processed auxiliary signals whenever alphanumeric text or graphics are displayed.

2. the apparatus recited in claim 1 wherein:

said modifying means includes means for controlling the contrast of images reproduced by said image reproducing device.

* * * * *